United States Patent [19]
Hamatani et al.

[11] Patent Number: 5,738,303
[45] Date of Patent: Apr. 14, 1998

[54] MECHANISM FOR ARMING, DISARMING AND ACTIVATING AIRPLANE EMERGENCY SLIDE EVACUATION SYSTEMS

[75] Inventors: Tomio Hamatani, Seattle; David Brockmeyer, Bellevue, both of Wash.; Katsuya Ikeda, Kanuma; Hisao Kondo, Nagoya, both of Japan

[73] Assignee: The Boeing Company, Seattle, Wash.

[21] Appl. No.: 441,283

[22] Filed: May 15, 1995

[51] Int. Cl.$^6$ .............................. B64D 25/14; B64C 1/34
[52] U.S. Cl. .................................. 244/129.1; 244/137.2; 244/905
[58] Field of Search ..................... 244/137.2, 905, 244/129.1; 441/101; 193/25 B; 182/48; 24/609, 637

[56] References Cited

U.S. PATENT DOCUMENTS

| | | | |
|---|---|---|---|
| 3,463,266 | 8/1969 | Day .......................................... | 244/905 |
| 3,633,853 | 1/1972 | Collins ..................................... | 244/905 |
| 3,744,816 | 7/1973 | Yamaguchi et al. ..................... | 441/101 |
| 4,106,729 | 8/1978 | Bergman et al. ........................ | 244/905 |
| 5,106,036 | 4/1992 | Sepstrup ................................... | 244/905 |
| 5,400,985 | 3/1995 | Banks ................................... | 244/137.2 |

FOREIGN PATENT DOCUMENTS 3-157297   7/1991   Japan .

*Primary Examiner*—Galen L. Barefoot
*Attorney, Agent, or Firm*—Christensen O'Connor Johnson & Kindness PLLC

[57] ABSTRACT

A mechanism(10) arms, disarms, and activates an airplane emergency evacuation system having a slide with one end connected to a girt bar (16). The mechanism includes floor fittings (18) mountable below and at each edge of the airplane door (14). Each floor fitting includes a base (32) defining a notch (40) for receiving the girt bar and a pawl (42) mounted to the base. The pawl rotates relative to the base from a locked position preventing removal of the girt bar from the notch, and to an unlocked position permitting removal of the girt bar. Support fittings (20) mountable to the door, engages the floor fittings when the door is closed and locked. A first jaw (58) extends downwardly to one side of the notch, and faces generally towards the notch from the support fitting. First and second linkage members (60) and (70) connect to one another and rotatably mount to the support fitting. A second jaw (94) extends from the second linkage member and faces generally towards the first jaw. The mechanism operates to rotate the second jaw towards the first jaw to capture the girt bar therebetween, and to rotate the pawl to the unlocked position to disarm the system and allow normal use of the door. To arm the system, the second jaw is rotated in the opposite direction which releases the girt bar and causes the pawl to securely lock the girt bar to the floor of the airplane.

18 Claims, 5 Drawing Sheets

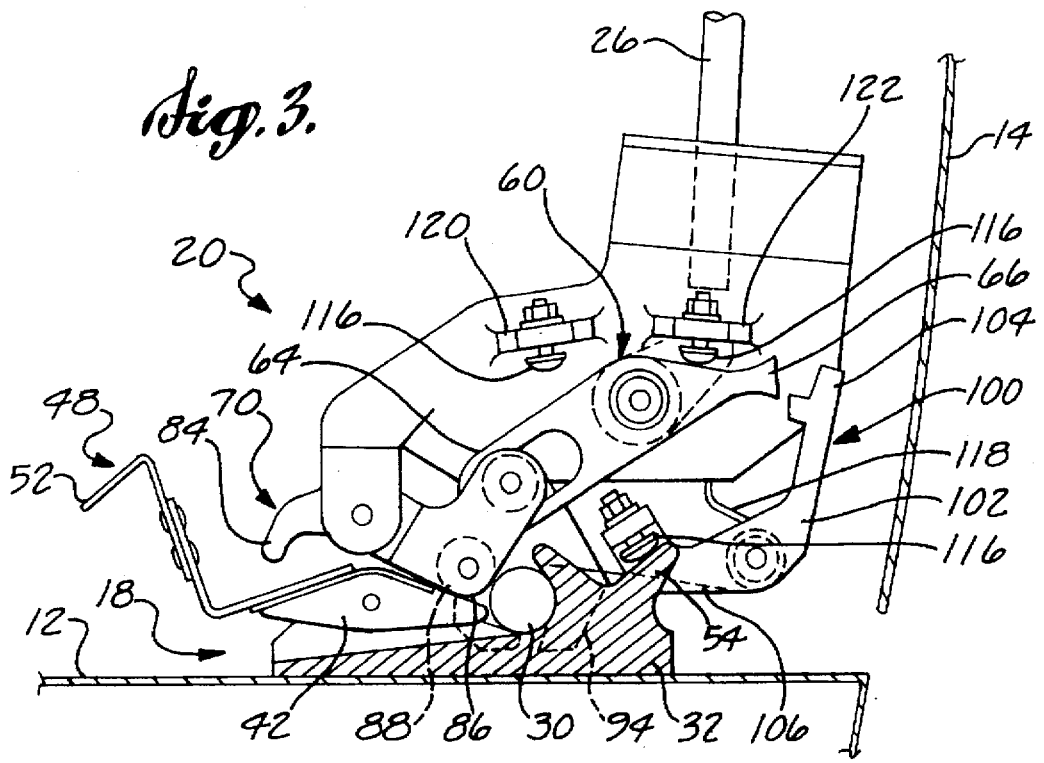
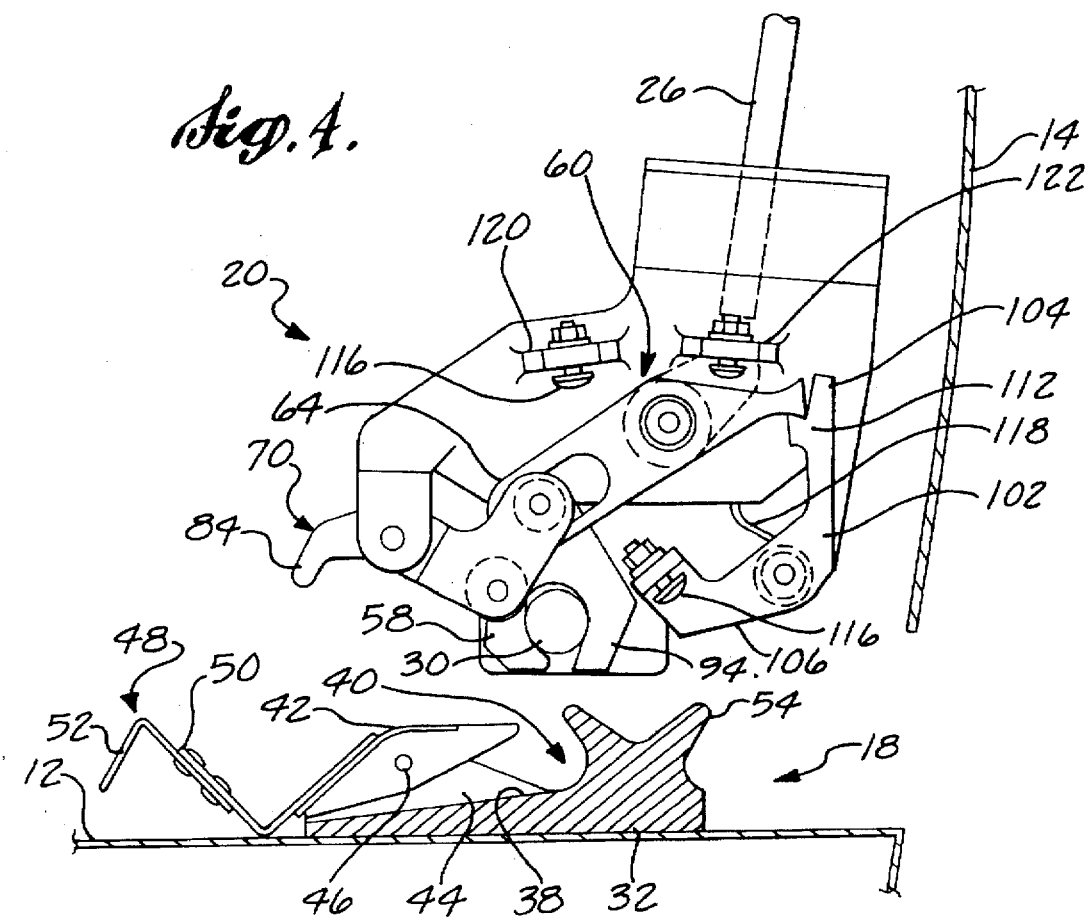

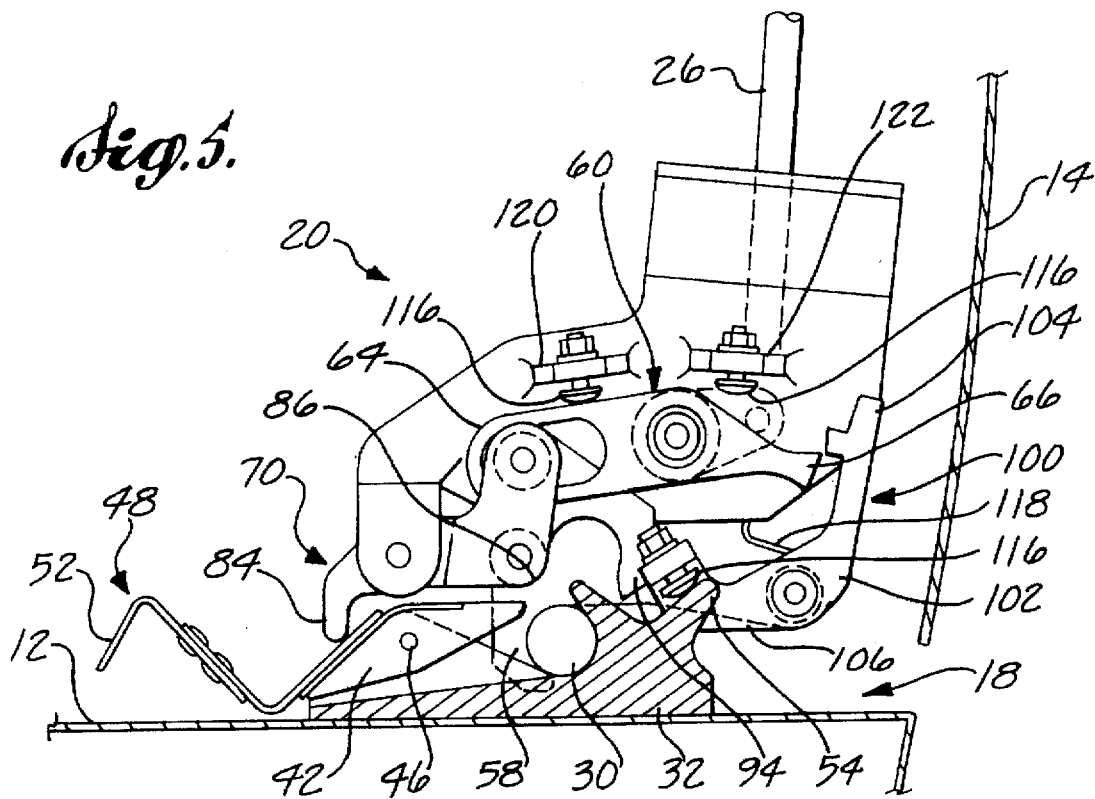
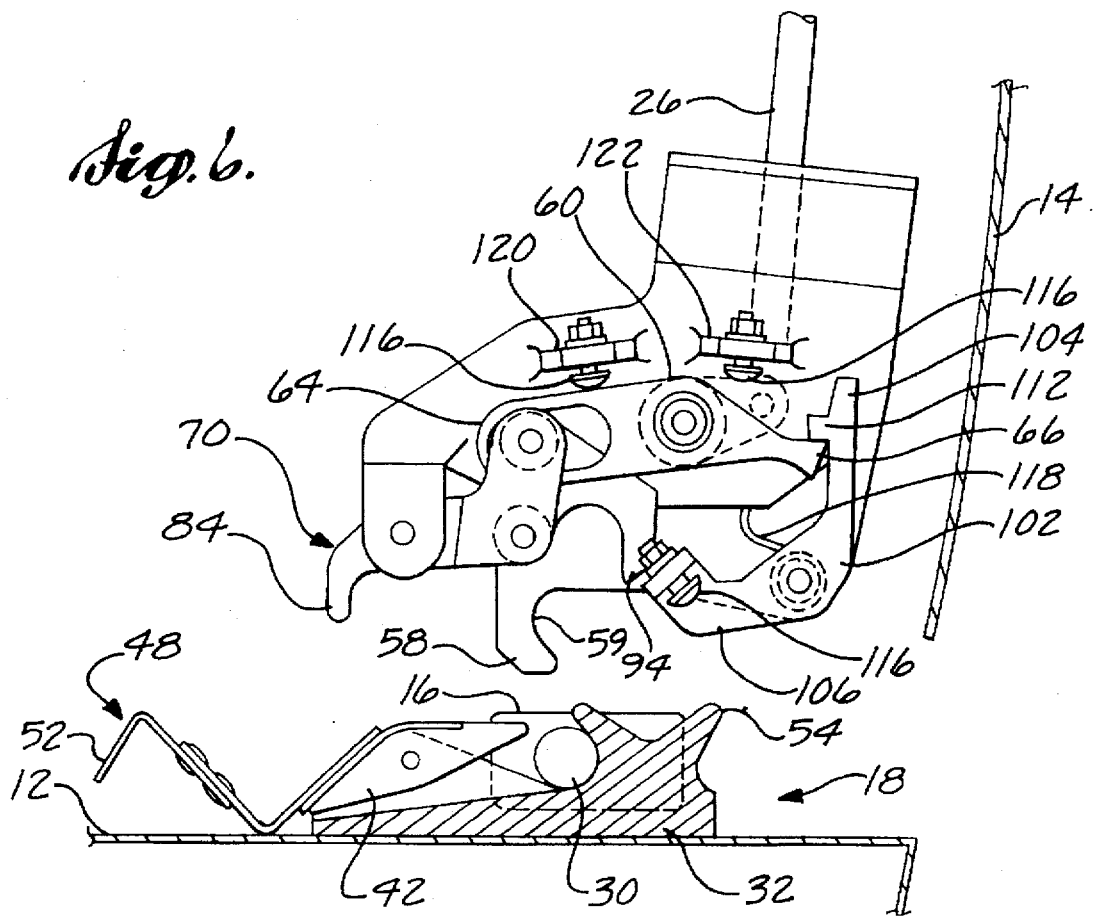

MECHANISM FOR ARMING, DISARMING AND ACTIVATING AIRPLANE EMERGENCY SLIDE EVACUATION SYSTEMS

FIELD OF THE INVENTION

The present invention relates generally to mechanisms for arming, disarming and activating emergency systems, and in particular to the mechanisms for arming, disarming and activating emergency evacuation systems in commercial passenger airplanes.

BACKGROUND OF THE INVENTION

Frequently, commercial passenger airplanes include an emergency evacuation system having an inflatable slide for use with service or passenger entry doors. Generally, the slide connects to the inside of the door in a folded, deflated configuration. Before the airplane takes-off, flight personnel arm the slide evacuation system. When the system arms, the base of the slide anchors to the fuselage of the airplane below the door. In an armed system, opening the door that is associated with the slide causes the evacuation system to activate. When activated, the system powers the door open and unfolds and inflates the slide using one or more pneumatic reservoirs of pressurized gas. When personnel disarm the system, the base of the slide anchors to the door. Thus, when the door opens, the base of the slide moves with the door and the system does not activate.

There are three major problems with the emergency slide evacuation system. First, sometimes personnel open the door following a normal flight and landing without having disarmed the system. This causes the slide to unfold and inflate, resulting in embarrassment and expense for the air carrier.

Second, occasionally personnel unintentionally arm the system when the door is open. This causes the base of the slide to become unanchored. While not as dramatic as an unintentionally activated slide, this still results in expense for the air carrier because personnel must re-anchor the slide before the airplane can be flown again.

Third, the mechanism for activating the emergency slide evacuation system relies upon a mechanical linkage to puncture a diaphragm in a pneumatic reservoir of pressurized gas to activate the evacuation system. The mechanical linkage is complex, expensive to manufacture and maintain, and can be unreliable if not properly installed and/or maintained.

Attempts have been made to solve some of these problems. For example, Japanese Patent No. 3,157,297 teaches a mechanism for arming and disarming the slide evacuation system in airplanes that includes an interlock preventing arming when the door is open. Thus, personnel cannot cause the slide to become unanchored from the door while the door is open. However, the interlock mechanism is unnecessarily complex and expensive to manufacture and install.

The present invention provides an improved solution to the foregoing problems.

SUMMARY OF THE INVENTION

The present invention provides a mechanism for arming, disarming and activating an emergency evacuation system in an airplane. An emergency evacuation system employing the invention includes an escape slide and a pneumatic reservoir containing pressurized gas sealed behind a diaphragm for activating the emergency evacuation system. The slide includes a girt bar that is connected to one end of the slide. When the evacuation system is armed, the girt bar is secured to the fuselage of the airplane below a door. If the door is opened while the evacuation system is armed, the system activates to unfold and inflate the slide. When the system is disarmed, the girt bar is secured to the bottom of the door, and the emergency evacuation system is not activated when the door is opened.

The invention includes a pair of floor fittings that are installed to the floor of the airplane at each side of the door. Each floor fitting includes a notch for receiving the girt bar. A pawl, included in each floor fitting is rotatable from a position in which it retains the girt bar in the notch (system armed) to a position in which the girt bar can be withdrawn from the notch and secured to the lower edge of the door (system disarmed).

Also included in the invention is a pair of support fittings that are installed to the airplane door, for engagement with the floor fittings when the door is closed and locked. Each support fitting includes a downwardly extending first jaw. When the door is closed and locked, the jaws encircle the inboard portion of the girt bar end regions.

Each of the support fittings also include a second downwardly extending jaw that can be rotated to partially encircle the outboard portion of a girt bar end region. Rotation of the second jaw to engage the girt bar disarms the evacuation system and is effected by rotating a handle that is located on the door. Rotation of the second jaw into its girt bar encompassing position also rotates the pawl of each floor fitting into a position that allows the girt bar to pass from the floor fitting notch when the door is moved toward the open position. An interlock, which is integrated into the linkage that operates the second jaw, ensures continued securement of the girt bar between the jaws of the support fittings (and, hence, to the door) by preventing rotation of the second jaw in a direction that would release the girt bar. This interlock feature prevents accidental release or dropping of the girt bar through inadvertent operation of the evacuation system.

Rotating the handle that arms and disarms the emergency evacuation system to the system armed position rotates the second jaw to a position in which it does not partially encompass an end region of the girt bar and the girt bar is retained in the recess of the floor fitting by the pawls of the floor fittings. If the door is opened with the system armed, the escape slide is automatically deployed.

The currently preferred embodiments of the invention include an arrangement for reliably activating the emergency evacuation system. Included in the activation arrangement is a squib that is mounted to the pneumatic reservoir that powers the door to its open position. A battery or other source of electrical power is connected to the squib via two series connected switches. The first switch is closed when the handle that arms and disarms the system is in the armed position. The second switch closes as the inside door handle moves to its open position. Thus, if the door is opened with the system armed, current flows to the squib, which punctures a diaphragm that causes the door to be powered open by a first pneumatic reservoir, and subsequent inflation of the slide by a second pneumatic reservoir.

The invention also provides a flag for visually indicating that the emergency evacuation system is armed. The flag extends from the pawl of the floor fitting, and moves from a first position to a second position when the pawl rotates from the locked position to the unlocked position. When the pawl is in the locked position (girt bar secured by the floor fittings), a brightly colored region of the flag (or other indicia) can be readily observed.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 illustrates one end of the arming and disarming mechanism shown in FIG. 1 with the door being shown in the closed and locked position, and with the arming and disarming mechanism being depicted in the disarmed condition;

FIG. 4 illustrates the mechanism of FIG. 3 with the door being shown closed and unlocked, and with the mechanism being shown in the disarmed condition;

FIG. 5 illustrates the mechanism shown in FIG. 3 with the door being closed and locked, and with the mechanism operated to arm the emergency slide evacuation system;

FIG. 6 illustrates the mechanism shown in FIG. 3 with the door being shown closed and unlocked and the arming and disarming mechanism being shown in the armed condition.

DETAILED DESCRIPTION OF THE PREFERRED EMBODIMENT

Figure 1:
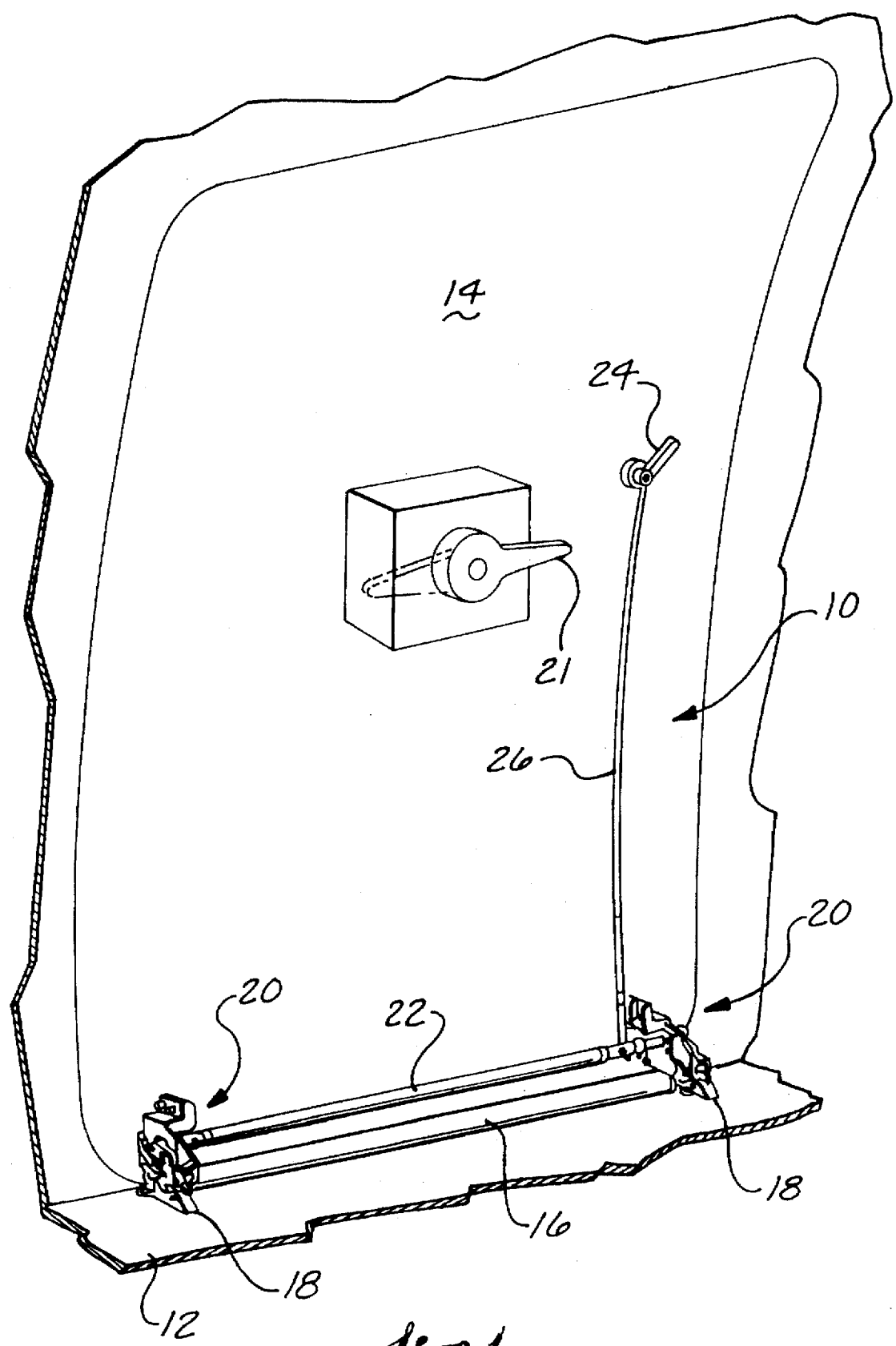
FIG. 1 illustrates a perspective view of a preferred embodiment of an arming and disarming mechanism constructed in accordance with the present invention and connected to the door and floor of an airplane.

FIG. 1 illustrates a preferred embodiment of a mechanism 10 in accordance with the present invention, mounted to a service or passenger entry door 14 of an airplane. The mechanism 10 arms and disarms an emergency slide evacuation system which can be deployed for rapid exiting airplane through door 14. The evacuation system (not shown in FIG. 1), includes an inflatable slide, which is stowed in a deflated, folded configuration within a container that fastens to the inside surface of the door 14. The base of the slide extends from the lower end of the container. When the mechanism 10 arms the system, the base of the slide is anchored to the fuselage 12 of the airplane below the door 14. Opening the door 14 when the system is armed triggers the system to inflate and unfold the slide.

In FIG. 1, the end of the slide is secured to a girt bar 16 located at the foot of the door 14. The mechanism 10 connects the girt bar 16 to the fuselage 12 of the airplane below the door 14 to arm the system. Thus, when the evacuation system activates the slide, the base of the slide will be anchored to the fuselage below the door 14 as the slide unfolds and inflates. To disarm the system, the mechanism 10 connects the girt bar 16 to the door 14. Hence, when the door 14 opens, the slide moves with the door.

The mechanism 10 includes floor fittings 18 mounted at opposite ends of the door 14 for receiving the ends of the girt bar 16 when the mechanism 10 arms the slide evacuation system. Each floor fitting 18 removably mates with a corresponding support fitting 20 mounted to the foot of the door 14. The support fittings 20 anchor the ends of the girt bar to the door 14 when the evacuation system is disarmed.

When the door 14 closes and locks, the door 14 vertically aligns the support fittings 20 with the floor fittings 18, and causes the support fittings to mate with the floor fittings. Specifically, door 14 of FIG. 1 is a service or passenger entry door of the type that moves upwardly relative to the fuselage of the airplane when the door unlatches or unlocks. Thereafter, the door swings outwardly to open the entrance to the airplane. When closing, the door 14 swings inwardly, and then moves downwardly relative to the fuselage 12 to latch or lock the door. Thus, closing the door 14 vertically aligns each support fitting 20 with its associated floor fitting 18. Further, locking the door 14 causes the support fittings 20 to move downwardly (with the door) for engagement with the floor fittings 18. Personnel rotate a door handle 21 on the inside of the door 14 from a first position to a second position to lock and unlock the door 14.

As is shown in FIG. 1, a torque tube 22 extends between the support fittings 20. During the evacuation system disarming sequence, the torque tube 22 is rotated in one direction to cause the support fittings 20 to release the girt bar 16. During the evacuation system arming sequence, the torque tube 22 is rotated in the other direction to grasp the girt bar 16. A handle 24 mounted to the inside of the door 14 is operated between first and second positions to rotate the torque tube 22 in the requisite directions. A push-pull cable 26 connects the handle 24 to the torque tube 22 at the foot of the door 14, for transferring torque from the handle to the torque tube. The push-pull cable 26 is of the type having a relatively stiff outer sheath that allows the push-pull cable to transfer axial force between handle 24 and torque tube 16. A cable slidably mounted in the sheath is extended upwardly and downwardly as the handle 24 is rotated to, in turn, rotate the torque tube 22. Alternatively, other structure can be used to transfer torque from the handle 24 to the torque tube 22, such as a conventional linkage rod, or pulley system by way of non-exclusive illustrative example.

Figure 2:
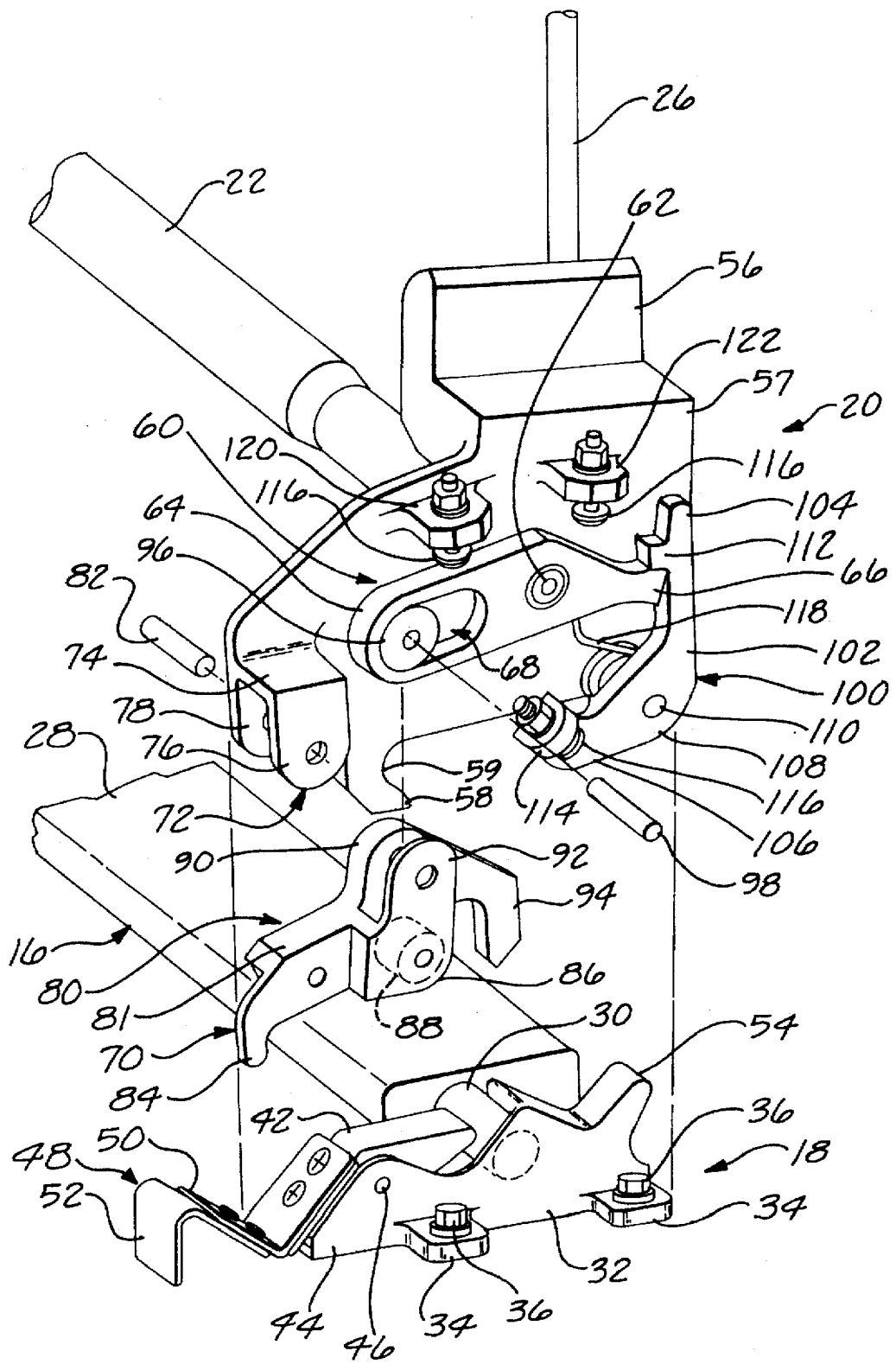
FIG. 2 illustrates an enlarged perspective view of one end of the mechanism in partially exploded format.

Referring to FIG. 2, the girt bar 16 includes an intermediate body portion 28 that is substantially rectangular in cross-sectional geometry. A cylindrical end segment 30 extends from each end of the intermediate body portion 28 along a common axis that is generally parallel to the longitudinal axis of the body portion 28.

Each floor fitting 18 includes a base 32 for mounting to the fuselage 12 of the airplane. Preferably, the base 32 includes horizontally extending flanges 34, through which bolts 36 (or another type of penetration fasteners) extend to mount the base 32 to the fuselage 12. The base 32 is adjustable upwardly and downwardly by inserting or removing shims (not shown) between the base and fuselage 12 of the airplane. Additionally, the inboard and outboard position of the base 32, i.e., the position of the base in the direction towards or away from the door, is adjustable using serrated plates (not shown) inserted between the base and the fuselage 12. The serrations on the plates are selectively mated with serrations formed on the bottom of the base 32 to adjust the inboard and outboard position of the base.

With reference to FIG. 4, a notch-like recess 40 is located in the mid region of each base 32. The recesses 40 face away from the door 14 and are positioned for receiving the cylindrical end segments 30 of girt bar 16. A generally flat, smooth surface portion 38 that slopes downwardly away from the door 14 forms the lower surface of notch 40. The end of the notch 40 that faces the intermediate body portion of the girt bar 16 is open so that the cylindrical segment 30 of the girt bar can extend into notch 40, in the manner shown in FIG. 2. The opposite end of the notch 40 is terminated by an upwardly and outwardly extending wall 44. A second wall 44 extends along the opposite side of base 32.

Located between the walls 44 is a diamond-shaped pawl 42, which is mounted for rotation about a pin 46. When the end of the pawl 42 nearest the notch 40 is rotated to its downward-most or unlocked position, the cylindrical end segments 30 of girt bar 16 can pass into or be withdrawn from notch 40. (FIGS. 3 and 4.) When the end of pawl 42 is in its upward-most rotational or locked position, the girt bar cylindrical segments 30 are captured in and retained by the notch 40. (FIGS. 5 and 6.) The pawl 42 has a center of gravity that causes the pawl to remain in the locked position. Additionally, a torsion spring (not shown) encircles the pin 46 to bias the pawl 42 in the locked position. Thus, when the cylindrical segments 30 of the girt bar 16 are located in the notch 40, the pawls 42 lock the girt bar to the floor fittings 18.

A flag 48 mounts to the end of the pawl 42 that is opposite notch 40. The flag includes a generally L-shaped bracket 50 having one leg mounted to the pawl 42. The other leg extends upwardly. A generally V-shaped plate 52, having one leg longer than the other mounts to the transverse leg of the L-shaped bracket 50. The longer leg of the V-shaped plate 52 mounts to the upwardly extending leg of the L-shaped plate 50 with the V-shaped plate opening downwardly. The bracket 50 and plate 52 may be connected to one another by any method known in the art, such as by using penetration-type fasteners, welding, soldering, adhesives, and etc. As will be discussed in more detail later, preferably at least a portion of the flag 48 is painted a readily noticeable color such as yellow, orange, or red.

The portion of the base 32 of the floor fitting 18 nearest the door 14 includes a finger-like projection 54, which extends angularly upward toward the door 14. As will be explained in more detail later, the finger 54 actuates an interlock device on the support fitting 20 when the door 14 is brought into the closed position.

As can best be seen in FIG. 2, the support fitting 20 includes a base plate 56 mountable to the door 14. Extending downwardly from base plate 56 is a jaw 58. As shown in FIG. 5, when the door 14 is closed and locked, the jaw 58 is positioned between walls 44 of floor fitting 18 so that a radiused inner edge 59 of the jaw 58 partially encircles the cylindrical end segment of girt bar 16.

As also can be seen in FIG. 2, a first linkage member or slotted bell crank 60 is rotatably mounted to a vertically extending flat surface 57 of the base plate 56. More particularly, a pin or axle 62 that is press-fit or otherwise joined to bell crank 60 passes through a suitably sized opening in the base plate 56 and connects to one end of the torque tube 22. Rotation of the torque tube 22, which is substantially parallel with the axial centerline of girt bar 16, in turn rotates axle 62 and causes the bell crank 60 to rotate.

Located at one end of the bell crank 60 is a connection arm 64 that extends away from the axle 62 in a direction that points generally away from the door 14. Located at the distal end of connection arm 64 is a slot 68 having radiused end regions. The longitudinal axis of the slot 68 is substantially coincident with the longitudinal axis of the connection arm 64.

Located at the opposite end of bell crank 60 is an interlock arm 66 that extends downwardly from the axle 62 to form an obtuse angle with the connection arm 64. The distal end of the interlock arm 66 forms a dove-tail.

A second linkage member 70 rotatably mounts to the flat surface 57 at a position that is below and inboard of the bell crank 60. More particularly, the bottom inboard portion of each base plate 56 is configured so as to form two spaced-apart substantially parallel flange regions 76 and 78, which extend downwardly toward the floor of the airplane.

Extending upwardly between flanges 76 and 78 is a first arm 80 of the second linkage member 70. A pin or axle 82 passes through aligned openings in the flanges 76 and 78 and an opening in the first arm 80 of the second linkage member 70 so that the second linkage member 70 (i.e., first arm 80) is rotatable about an axis that is generally parallel to the longitudinal axis of the girt bar 16.

The first arm 80 of the second linkage member 70 includes a central region 81 of generally rectangular cross section that surrounds the axle 82. The end of the first arm 80 that is most distant from the airplane door forms a downwardly directed finger 84. As shall be described in more detail, finger 84 presses against pawl 42 during the door opening sequence to ensure that pawl 42 is not jammed or stuck in place by ice or other foreign matter.

The end region of first arm 80 that is nearest airplane door 14 is dimensioned and arranged to: (1) provide a second interconnection between first arm 80 and base plate 56; (2) rotate pawl 42 downwardly so that girt bar 16 is released from the floor fittings when the evacuation system is disarmed and airplane door 14 is opened; and (3) interact with jaw 58 of base plate 56 to encompass the cylindrical end segment 30 of girt bar 16 so as to secure girt bar 16 to the airplane door 14 when the evacuation system is disarmed and the door is being moved between the open and closed positions.

To provide a second interconnection of first arm 80 with base plate 56, first arm 80 includes two upwardly extending, substantially parallel, spaced-apart flange regions 90 and 92. The end of bell crank 60 that includes slot 68 extends between the flange regions 90 and 92. A pin or axle 98 passes through suitably sized openings in the flange regions 90 and 92. Located within slot 68 is a cylindrical roller having a central passage for accommodation of axle 98. Roller 96 allows flange regions 90 and 92 (and hence, first arm 80 of second linkage member 70) to move laterally along the slot 68 during the hereinafter discussed operational sequence of the invention.

As can be seen in FIGS. 2 through 5, flange region 90 of the first arm 80 extends angularly and downwardly away from the region of flange 90 that receives axle 82 to form a jaw 94. Jaw 94 is somewhat hook-like in geometry, being configured for partial encirclement of the cylindrical segments 30 of girt bar 16 when the emergency evacuation system is disarmed. As is shown in FIG. 4, and as shall be described in more detail, jaw 94 encircles the portion of a cylindrical segment 30 that faces the airplane door 14, acting in cooperation with jaw 58 of support fitting 20 to secure the girt bar 16 to the airplane door 14 when the emergency evacuation system is disarmed (shown in FIGS. 3 and 4).

The lower region of flanges 90 and 92 are radiused to form a transition between the flanges and central region 81 of the first arm 80. Located between the radiused lower portions of flanges 90 and 92 is a cylindrical roller 88. As can be seen in FIG. 3, when airplane door 14 is closed and the emergency evacuation system is in a disarmed condition, cylindrical roller 88 and the radiused edges of flanges 90 and 92 bear against pawl 42, rotating the end of pawl 42 that faces the door 14 downwardly. Urging pawl 42 into this rotated position allows the cylindrical segments 30 of girt bar 16 to pass from recess 40 of the floor fittings when the evacuation system is unarmed and the airplane door is being opened in the manner shown in FIG. 4 and described in more detail hereinafter.

An interlock, which is generally indicated by reference numeral 100 in FIG. 2, prevents operation of the invention in a manner that would allow the release of girt bar 16 when the emergency evacuation system is disarmed and the airplane door 14 is open. Without such an interlock, it would be possible to rotate door handle 24 to the armed position, which would release girt bar 16 and allow it to fall downwardly from the lower edge of door 14.

In the arrangement shown in FIGS. 2 through 6, interlock 100 is mounted in the lower corner region of base plate 56 that is nearest the door 14. A bell crank 102, which is positioned adjacent the flat surface 57 of the base plate 56, includes an upwardly extending engagement arm 104. An actuator arm 106 forms an obtuse angle with engagement arm 104, pointing upwardly away from airplane door 14. A pin 110 passes through the portion of bell crank 102 that extends between engagement arm 104 and actuator arm 106 so that the bell crank 102 can be rotated about an axis of rotation that is parallel to the longitudinal axis of the girt bar 16.

Located at the upper end of engagement arm 104 is a finger 112 that extends inwardly toward the slot 68 of the bell crank 60. A torsion spring 118 located between the interlock bell crank 102 and the flat surface 57 of base plate 56 encircles pin 110 so as to bias the bell crank 102 in the position shown in FIG. 2. In that position, engagement arm 104 is urged toward bell crank 60 and the finger 112 of the engagement arm 104 prevents counterclockwise rotation of bell crank 60.

The end region of the actuation arm 106 is bent or otherwise formed to project orthogonally away from the bell crank 102. Located in the orthogonally projecting portion of actuation arm 106 is an adjustable stop 116 (shown as a bolt in FIGS. 2 through 6). When the door is closed, as shown in FIGS. 3 and 5, the stop 116 presses against the upper surface of a finger-like region 54 of the floor fitting 18. In the preferred embodiments of the invention, the head of the bolt forming the stop 116 is coated with a pliant material, which tends to dissipate shock forces and reduce wear. When stop 116 is pressed against floor fitting 18, the bell crank 102 of the interlock device 100 is rotated to a position that allows the interlock arm 66 of the slotted bell crank 60 to be swung upwardly past the finger 112 of the bell crank 102. As shall be described in greater detail, rotation of bell crank 102 in this manner releases girt bar 16 from door 14 when the door is closed and the mechanism handle 24 is moved from the system disarmed position to the system armed position.

When the evacuation system is disarmed and the door 14 is not latched, the support fitting 20 is positioned above the floor fitting 18, as shown in FIG. 4. Thus, the stop 116 no longer presses against the finger 54 of the floor fitting 18 and the torsion spring 118 urges the engagement arm 104 of bell crank 102 into abutment with the interlock arm 66 of the slotted bell crank 60. This causes the finger 112 of the engagement arm 104 of the interlock bell crank 102 to be positioned below the interlock arm 66 of the slotted bell crank 60, thereby preventing accidental arming of the slide evacuation system, with resultant inadvertent release of girt bar 16.

A fuller understanding of the invention can be had by considering operation of the invention during a normal departure and arrival of the airplane and during emergency evacuation.

When the airplane is prepared for departure, the airplane door 14 is swung into the closed position. As can be seen in FIG. 4, which depicts the door closed but not yet latched, the circular end segments 30 of girt bar 16 are securely grasped between jaws 58 and 94 of the support fittings 20 thereby retain the girt bar 16 to the bottom of door 14. Finger 112 of bell crank 106 extends below the upper end of bell crank 60 thereby preventing rotation of handle 24 of door 14 (not shown in FIG. 4) in a manner that would rotate bell crank 60 and release girt bar 16 from securement between jaws 58 and 94. When the system is in this condition, pawl 42 of floor fitting 18 is biased so that the upper end of the pawl extends cross the opening to recess 40. When door 14 is latched, the door moves downwardly moving each base plate 56 into abutment with the associated floor firing 18. As shown in FIG. 3, latching the airplane door 14 places circular end segments 30 of girt bar 16 in recesses 40 of floor fittings 18. At this point of the sequence, the girt bar 16 remains secured to the bottom of the door by jaws 58 and 94 of the base fittings 56. It also can be noted that movement of the airplane door 14 to its downward, latched position causes roller 88 and the radius corners 86 of first arms 80 of the base plates 56 to press downwardly on the upper end of pawl 42 of the floor fittings 18. This causes the upper end of pawl 42 to be rotated downwardly so that it does not extend across the opening of recess 40 of base plate 56. In addition, as the door 14 moves downwardly, the end of stop 116 of bell crank 102 comes into contact with the upperly extending finger-like portion 54 of floor fitting 18. When the door is in the fully downward and latched position of FIG. 3, stop 116 presses against finger-like protrusion 54 of base plate 56 with bell crank 102 being rotated to a position that will allow the upper end of bell crank 60 to pass downwardly beyond finger 112 of bell crank 102.

The next step of the operational sequence is arming the emergency evacuation system for take off. To arm the system, the handle 24 for mechanism 10 is rotated to a position that causes pushpull cable 26 to rotate bell crank 60 in a clockwise direction (relative to the orientation shown in FIGS. 2 through 6). With specific reference to FIG. 5, rotation of bell crank 60 causes corresponding rotation of first arm 80 so that jaw 94 is rotated away from circular end 30 of girt bar 16. In addition, rotation of first arm 80 moves roller 88 and the radius corner of first arm 80 upperly and away from the end of pawl 42. This releases pawl 42, which returns to the biased position in which it extends cross the opening of access 40 by an amount sufficient to prevent removal of the girt bar circular end segments 30 from recess 40.

To provide a positive tactile indication to the crew member that arms the system, the upper edge of bell crank 60 comes into contact with a stop mechanism when bell crank 60 is rotated to the armed position. As can best be seen in FIG. 2, the stop mechanism includes a flange 120 that projects orthogonal outward from the surface of base plate 56 at a location above bell crank 60. A bolt 116, or similar adjustable stop device extends upwardly through the flange 120. When bell crank 60 swings into the armed position, the upper edge of the bell crank is forced against the head of bolt 116 to provide a "bottoming-out" effect that mimics the operation of handle arrangements that are linked by solid members instead of the somewhat flexible push-pull cable 26.

Upon routine arrival at the airplane's destination, the crew member disarms the system by rotating the handle 24 of the mechanism 10 to the disarmed position. This causes bell crank 80 to be rotated to the previously described position that is shown in FIG. 3. When bell crank 60 swings into the dished position, the upper surface of the upper end of bell crank 60 comes into contact with a stop mechanism to provide tactile indication that the handle 24 has reached the disarmed position. The stop mechanism that provides this tactile indication is similar in configuration to the previously described stop mechanism for indicating positioning of the handle 24 in the system armed position. Specifically, extending from base plate 56 at a position above the upper end of bell crank 60 is a orthogonally projecting flange 122. An adjustable stop 116 (a bolt in the depicted arrangement) extends upwardly through the flange 122.

With the system in the disarmed position, the crew member unlatches airplane door 14, which moves upwardly to the position described relative to FIG. 4. As the door moves into the position shown in FIG. 4, bell crank 102 is allowed to rotate (counterclockwise in FIGS. 3 and 4) so that the finger-like protrusion 112 of bell crank 102 extends under the upper end of bell crank 60, thereby securing bell crank 60 in a manner that prevents movement of mechanism handle 24 to the system armed position. As was described previously relative to FIG. 4, the circular end segments 30 of girt bar 16 are circled and grasped by jaws 58 and 94 of the support fitting 20. In addition, as door 14 moves upwardly pawl 42 returns to the biased position in which the upper end of the pawl extends across the opening of recess 40 in base plate 56. Girt bar 16 is thus secured to the bottom of the door and the door may be opened without deploying the escape slide.

Operation of the invention to deploy the emergency evacuation system can be understood relative to FIGS. 5 and 6. In particular, as previously noted, FIG. 5 depicts the situation in which the airplane door is closed and latched and the invention is operated to arm the emergency evacuation system. In the armed condition, the cylindrical end segments 30 of girt bar 16 rests in the recesses 40 of the floor fittings 18. Since each pawl 42 of floor fitting 18 is biased into a position in which the upper end of the pawl extends over the opening to recess 40, the circular end segments 30 (and hence girt bar 16) are secured to the floor of the airplane.

As is shown in FIG. 6, when the door 14 is unlatched, the door moves upwardly causing the support brackets 20 to move away from the floor fittings 18, the door 14 can then be swung into an open position with the girt bar 16 and, hence the base of the escape slide secured to the bottom of the door opening. As the door opens, the emergency evacuation system is activated to rapidly inflate the escape slide so that it extends downwardly to allow passenger and crew egress.

The downwardly directed finger 84 of the second linkage member 70 serves to ensure the end of the pawl 42 nearest the girt bar 16 does not freeze in the unlocked position as shown in FIG. 3. More particularly, due to ice formation or other reasons, the pawl 42 could freeze in the unlocked position despite a bias to return to the locked position. Thus, when the support fitting 20 moves away from the pawl 42, as shown in FIG. 4, the pawl would remain in the unlocked position. This is a problem when the mechanism 10 arms the slide evacuation system because the floor fitting 18 would not properly anchor the girt bar 16.

Hence, when the mechanism 10 arms the slide evacuation system, the finger 84 rotates to a downward position as shown in FIGS. 5 and 6. Thus, when the door 14 locks as shown in FIG. 5, the finger 84 presses against the end of the pawl 42 farthest from the girt bar 16, forcing the pawl to return to the locked position.

Figure 7:
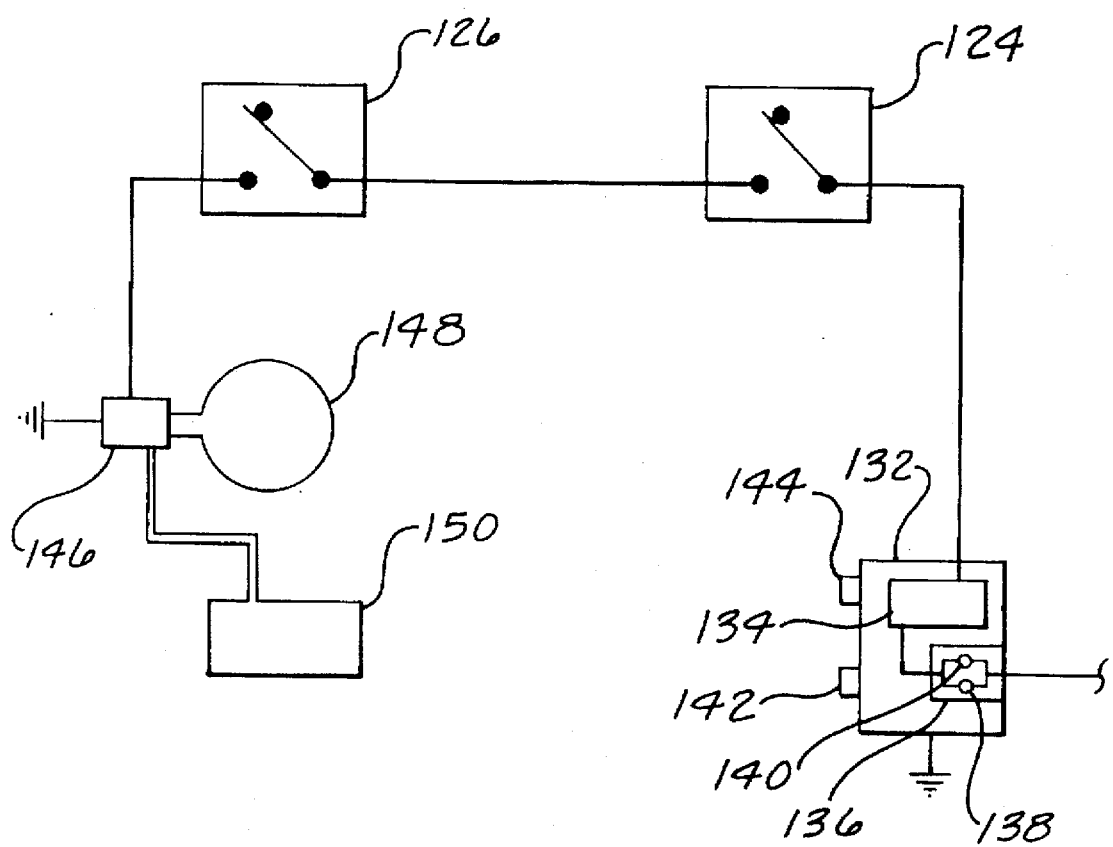
FIG. 7 schematically illustrates an electrical system for operation of an emergency evacuation system that employs the arming and disarming mechanism shown in FIG. 1.

Although various arrangements can be used in conjunction with the invention to deploy the emergency evacuation escape slide, the currently preferred embodiments of the invention use an electrical interlock system that allows activation only when the mechanism handle 24 is in the armed position and the inside door handle 21 is placed in its open position. This preferred arrangement is schematically depicted in FIG. 7. In the arrangement of FIG. 7, a battery pack 132 or other source of electrical power is connected to an electrical squib 146 that is mounted to a pneumatic reservoir 148. When current is supplied to electrical squib 146, an explosive charge is ignited to drive a penetrator that punctures a diaphragm in the pneumatic reservoir 148. Pneumatic pressure supplied by pneumatic reservoir 148 operates a pneumatic actuator 150 to rapidly power the door 14 open, and allow the escape slide to inflate by means of a second pneumatic reservoir (not shown).

With the arrangement of FIG. 7, the escape slide can be deployed when mechanism handle 24 is in the system armed position and the inside door handle 21 is placed in the open position. In particular, switch 124 is mechanically coupled to the handle 24 (or some other element of the invention) so that switch 124 is closed (conducting) only when the system is in the armed position. In a similar manner, series connected switch 126 is closed (conducting) only when the inside airplane door handle 21 is placed in its open position.

The battery pack 132 includes a rechargeable battery 134, such as a nickel-cadmium battery. Additionally, the battery pack 132 includes a battery charger 136 having a trickle charger 138 and a fast charger 140. The fast charger 140 rapidly charges the battery 134, while the trickle charger 138 maintains the fully charged status of the battery. Electrical power from the airplane is supplied in parallel to the trickle charger 138 and the faster charger 140. In turn, the trickle charger 138 and the fast charger 140 supply electrical power in parallel to the battery 134.

A test switch 142 and a safety switch 144 are included with the battery pack 132. The safety switch 144 is for disconnecting power to the squib 146 to prevent unintentional activation of the squib during maintenance. The test switch 142 remains in the open position, unless pressed. When personnel press the test switch 144, it couples a light (not shown) to conventional circuitry, which illuminates the light if the trickle charger and/or fast charger are providing electrical power to the battery 134, and if the battery charge is above a predetermined level.

While the preferred embodiment of the invention has been illustrated and described, it will be appreciated that various changes can be made therein without departing from the spirit and scope of the invention. By way of illustrative, non-limiting example, the push-pull cable 26 could be replaced with a linkage member such as a rod, and the rechargeable battery 132 could be of a long-life, non-rechargeable type eliminating the need for a battery charger 136. In view of these and other alterations, substitutions and modifications that could be made by one of ordinary skill in the art, it is intended that the scope of letters patent granted hereon be limited only by the definitions of the appended claims.

The embodiments of the invention in which an exclusive property or privilege is claimed are defined as follows:

1. A mechanism for arming/disarming and activating an emergency evacuation system in an airplane, the system including an escape slide having a girt bar connected to one end of the slide, the system being disarmed when the girt bar connects to a door of the airplane, and the system being armed when the girt bar connects to the fuselage of the airplane below the door, the door being movable from a closed and locked position to an open and unlocked position, the mechanism comprising:

(a) a floor fitting mountable to the fuselage of the airplane below the door, the floor fitting including:

(i) a base defining a notch for receiving the girt bar; and (ii) a pawl mounted to the base, the pawl being rotatable relative to the base from a locked position preventing removal of the girt bar from the notch when the girt is located therein, to an unlocked position permitting removal of the girt bar from the notch;

(b) a support fitting mountable to the airplane door and engaging with the floor fitting when the door is closed and locked, the support fitting including a downwardly extending first jaw, the jaw being positioned on one side of the notch, and facing theretowards when the door is closed and locked;

(c) a first linkage member rotatably mounted to the support fitting along an axis of rotation generally parallel to the longitudinal axis of the girt bar, the first linkage member including a connection arm having an end extending away from the axis of rotation, wherein a slot is defined in the end of the connection arm, the connection arm being rotatable from a first position to a second position; and rotatable from the second position to the first position; and (d) a second linkage member rotatably mounted to the support fitting along an axis of rotation generally parallel to the longitudinal axis of the girt bar, the second linkage member including:

(i) a bent arm having an elbow and an end, the end including a pin extending transversely therefrom and received in the slot of the first linkage member; and (ii) a second jaw facing generally towards the first jaw, whereby when the door is closed and clocked, rotation of the connection arm of the first linkage member from the first position to the second position causes the elbow to press against the pawl and rotate the pawl to the unlocked position, and the second jaw to rotate towards the first jaw, capturing the girt bar between the first and second jaws when the girt bar is located in the notch of the floor fitting, thereby disarming the emergency evacuation system, and rotation of the connection arm of the first linkage member from the second position to the first position causes the elbow to move away from the pawl to rotate the pawl to the locked position, and the second jaw to rotate away from the first jaw, thereby releasing the girt bar from between the jaws when the girt bar is located in the notch of the floor fitting and arming the emergency evacuation system.

2. The mechanism of claim 1, wherein the emergency evacuation system includes a pneumatic reservoir containing pressurized gas sealed behind a diaphragm, and the door includes a door handle movable to an open position for opening the door, and movable to a closed position for closing the door, the mechanism further comprising:

(a) a mechanism handle linked to the first linkage member for rotating the first linkage member;

(b) a first switch having an open position and a closed position, and coupled to the mechanism handle, the first switch being closed when the emergency evacuation system is armed, and open when the emergency evacuation system is disarmed;

(c) a second switch having an open position and a closed position, and couplable to the door handle, the second switch being closed when the door handle is in the open position, and open when the door handle is in the closed position;

(d) a source of electrical power; and (e) a squib mountable to the pneumatic reservoir and being electrically activatable to puncture the diaphragm in the pneumatic reservoir, the squib, the first and second switches, and the source of electrical power all being electrically connected in series with one another, wherein when the first and second switches close the source supplies the squib with electrical power, thereby activating the squib and puncturing the diaphragm in the pneumatic reservoir to activate the emergency evacuation system.

3. The mechanism of claim 1, further comprising a flag extending from the pawl, the flag moving from a first position to a second position when the pawl rotates from the locked position to the unlocked position to serve as a visual indicator of whether the emergency evacuation system is armed, and whether the emergency evacuation system is disarmed.

4. The mechanism of claim 1, further comprising a disarming stop connected to the support fitting, the first linkage member impacting the disarming stop when the connection arm of the linkage member is rotated from the first position to the second position to limit downward rotation of the connection arm and tactilely indicate the emergency evacuation system is disarmed.

5. The mechanism of claim 4, wherein the first linkage member includes an interlock arm extending below the disarming stop, the interlock arm rotating upward and impacting the disarming stop when the connection arm is rotated from the first position to the second position.

6. The mechanism of claim 4, further comprising an arming stop connected to the support fitting, wherein the first linkage member impacts the arming stop when the connection arm of the first linkage member is rotated from the second position to the first position to limit upward rotation of the connection arm and tactilely indicate the emergency evacuation system is armed.

7. The mechanism of claim 6, wherein the arming stop connects to the support fitting above the connection arm of the first linkage member, and the connection arm impacts the arming stop when the connection arm is rotated from the second position to the first position.

8. The mechanism of claim 1, further comprising an arming stop connected to the support fitting, wherein the first linkage member impacts the arming stop when the connection arm of the first linkage member is rotated from the second position to the first position to limit upward rotation of the connection arm and tactilely indicate the emergency evacuation system is armed.

9. The mechanism of claim 8, wherein the arming stop connects to the support fitting above the connection arm of the first linkage member, and the connection arm impacts the arming stop when the connection arm is rotated from the second position to the first position.

10. The mechanism of claim 1, further comprising a roller coaxially surrounding the pin for rolling in the slot.

11. The mechanism of claim 1, further comprising an interlock linkage member connected to the support fitting, the interlock linkage member being rotatable from a locking position engaging the first linkage member and preventing the first linkage member from being rotated from the second position to the first position, to an unlocking position disengaged from the first linkage member, the interlock linkage member including a spring biasing the interlock linkage member to remain in the locking position.

12. The mechanism of claim 11, wherein the interlock linkage member is in the form of a bell crank having first and second arms, and a vertex between the first and second arms, wherein the vertex is rotatably mounted to the support fitting.

13. The mechanism of claim 12, wherein the floor fitting contacts the first arm of the interlock linkage member when the door is closed and locked, thereby exerting a pressing force against the first arm and causing the interlock engaging member to rotate to the unlocking position.

14. The mechanism of claim 11, in which the spring is a torsion spring.

15. A device for indicating whether the emergency evacuation slide system in an airplane is armed, the system including a floor fitting mounted to the fuselage below a door of the airplane, the floor fitting including a pawl rotatable between a locked position and an unlocked position, the pawl being rotated about a horizontal axis extending longitudinally of the airplane to the locked position when the system is armed, and the pawl being rotated about said axis to the unlocked position when the system is unarmed, the device comprising a flag having an arm mountable to the pawl so as to extend inward, away from the door, toward the interior of the airplane to a location a substantial distance inward of the pawl and the floor fitting, the arm being mounted for swinging with the pawl and having an inner end, remote from the pawl and the floor fitting, located and adapted to provide a readily visible indication of the position of the pawl, wherein the flag's position visually indicates whether the system is armed.

16. A mechanism for activating an emergency slide evacuation system in an airplane, the evacuation system including a pneumatic reservoir containing pressurized gas sealed behind a diaphragm, the system being connected to a door of the airplane, the door having a handle movable to an open position for opening the door, and movable to a closed position for closing the door, and the system further including an operating handle movable manually between a first position in which the system is armed and a second position in which the system is unarmed, the mechanism comprising:

(a) a first switch having a closed position and an open position, and coupled to the operating handle, the first switch being closed when the emergency evacuation system is armed and opened when the emergency evacuation system is unarmed;

(b) a second switch having a closed position and an open position and (couplable) coupled to the door handle, the second switch being closed when the door handle is in the open position, and open when the door handle is in the closed position;

(c) a source of electrical power;

(d) a squib mountable to the pneumatic reservoir and electrically activatable to puncture the diaphragm in the pneumatic reservoir, the squib, the first and second switches, and the source of electrical power all being electrically connected in series with one another, wherein when the first and second switches close, the source supplies the squib with electrical power to activate the squib to puncture the diaphragm in the pneumatic reservoir, thereby activating the emergency evacuation, system; and (e) an actuator powered by the pneumatic reservoir to open the door automatically when the squib is activated.

17. The mechanism of claim 16, wherein the source of electrical power is a battery, the mechanism further comprising a battery charger for recharging the battery.

18. The mechanism of claim 17, wherein the battery charger includes a trickle charger and a fast charger.

* * * * *